(12) United States Patent
Miyazawa et al.

(10) Patent No.: US 10,529,494 B2
(45) Date of Patent: Jan. 7, 2020

(54) DIELECTRIC FILM

(71) Applicant: ZEON CORPORATION, Chiyoda-ku, Tokyo (JP)

(72) Inventors: Shinsuke Miyazawa, Tokyo (JP); Ayako Kato, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/512,920

(22) PCT Filed: Sep. 24, 2015

(86) PCT No.: PCT/JP2015/076945
§ 371 (c)(1),
(2) Date: Mar. 21, 2017

(87) PCT Pub. No.: WO2016/052303
PCT Pub. Date: Apr. 7, 2016

(65) Prior Publication Data
US 2017/0301473 A1 Oct. 19, 2017

(30) Foreign Application Priority Data
Sep. 30, 2014 (JP) .................. 2014-201155

(51) Int. Cl.
| | |
|---|---|
| *H01G 4/33* | (2006.01) |
| *B32B 15/08* | (2006.01) |
| *B29C 55/14* | (2006.01) |
| *H01G 4/18* | (2006.01) |
| *B29K 45/00* | (2006.01) |
| *B29L 31/34* | (2006.01) |

(52) U.S. Cl.
CPC .............. *H01G 4/33* (2013.01); *B29C 55/14* (2013.01); *B32B 15/08* (2013.01); *H01G 4/18* (2013.01); *B29K 2045/00* (2013.01); *B29L 2031/34* (2013.01); *B32B 2386/00* (2013.01); *B32B 2457/16* (2013.01)

(58) Field of Classification Search
CPC . H01G 4/33; H01G 4/18; B29C 55/14; B32B 15/08; B32B 2386/00; B32B 2457/16; B29K 2045/00; B29L 2031/34
USPC ........................................... 361/323
See application file for complete search history.

(56) References Cited

U.S. PATENT DOCUMENTS

| | | | |
|---|---|---|---|
| 2013/0021719 A1* | 1/2013 | Busch | B29C 47/0021 361/502 |
| 2015/0240008 A1* | 8/2015 | Schrock | C07F 11/00 525/332.1 |

FOREIGN PATENT DOCUMENTS

| | | |
|---|---|---|
| JP | S60262414 A | 12/1985 |
| JP | S63181411 A | 7/1988 |
| JP | H02250360 A | 10/1990 |
| JP | H0318113 A | 1/1991 |
| JP | H03286514 A | 12/1991 |
| JP | H05345817 A | 12/1993 |
| JP | H1160971 A | 3/1999 |
| JP | 2002194067 A * | 7/2002 |
| JP | 2002294067 A * | 10/2002 |
| JP | 2006052333 A | 2/2006 |

\* cited by examiner

*Primary Examiner* — Michael P McFadden
(74) *Attorney, Agent, or Firm* — Kenja IP Law PC

(57) ABSTRACT

The present invention is a film capacitor comprising a dielectric film and a metal layer, the dielectric film being a resin film obtained by stretching an unstretched film produced using a crystalline hydrogenated dicyclopentadiene ring-opening polymer, and heating the resulting stretched film, and the resin film having a softening point of 250 to 320° C., a thermal shrinkage ratio of 0.01 to 5.0% when heated at 200° C. for 10 minutes, a loss tangent (tan δ) of 0.0001 to 0.0010, and a coefficient of static friction of 0.01 to 1.00. The present invention provides a film capacitor that includes a resin film as a dielectric film, the resin film exhibiting excellent heat resistance, excellent withstand voltage properties, and excellent workability.

1 Claim, No Drawings

DIELECTRIC FILM

TECHNICAL FIELD

The present invention relates to a film capacitor that includes a resin film as a dielectric film, the resin film exhibiting excellent heat resistance, excellent withstand voltage properties, and excellent workability.

BACKGROUND ART

A film capacitor is a device that has a structure in which dielectric films and metal layers are disposed alternately, and can store an electric charge.

In recent years, a film capacitor has been increasingly reduced in size and increased in capacity, and has become easily generate heat when driven. Therefore, a resin film that is used as the dielectric film of a film capacitor has been required to exhibit better heat resistance.

A reduction in thickness has been desired for the dielectric film in order to reduce the size of a film capacitor. However, when the thickness of the dielectric film is reduced, the dielectric film tends to exhibit inferior withstand voltage properties and inferior workability. Note that the term "withstand voltage properties" used herein in connection with the dielectric film means that the dielectric film maintains an insulating state even at a high voltage, and the term "workability" used herein in connection with the dielectric film means that the dielectric film ensures that the film capacitor can be produced in a stable manner on an industrial scale.

Patent Literature 1 discloses a film capacitor that uses a film obtained by forming a hydrogenated norbornene-based ring-opening polymer or the like.

CITATION LIST

Patent Literature

Patent Literature 1: JP-A-11-60971

SUMMARY OF INVENTION

Technical Problem

A film formed of a hydrogenated norbornene-based ring-opening polymer is suitable as the dielectric film of a film capacitor (see Patent Literature 1). However, since a higher performance has been required for a film capacitor, a material that exhibits better heat resistance, withstand voltage properties, and workability has been desired.

The invention was conceived in view of the above situation. An object of the invention is to provide a film capacitor that includes a resin film as a dielectric film, the resin film exhibiting excellent heat resistance, excellent withstand voltage properties, and excellent workability.

Solution to Problem

In order to solve the above problem, the inventors conducted extensive studies with regard to a resin film that is used as the dielectric film of a film capacitor. As a result, the inventors found that a resin film that is obtained by stretching an unstretched film produced using a crystalline hydrogenated dicyclopentadiene ring-opening polymer, and heating the resulting stretched film, and has a softening point, a thermal shrinkage ratio, a loss tangent (tan δ), and a coefficient of static friction within specific ranges, exhibits excellent heat resistance, excellent withstand voltage properties, and excellent workability. This finding has led to the completion of the invention.

One aspect of the invention provides the following film capacitor (see (1) and (2)).

(1) A film capacitor including a dielectric film and a metal layer, the dielectric film being a resin film obtained by stretching an unstretched film produced using a crystalline hydrogenated dicyclopentadiene ring-opening polymer, and heating the resulting stretched film, and the resin film having a softening point of 250 to 320° C., a thermal shrinkage ratio of 0.01 to 5.0% when heated at 200° C. for 10 minutes, a loss tangent (tan δ) of 0.0001 to 0.0010, and a coefficient of static friction of 0.01 to 1.00.

(2) The film capacitor according to (1), wherein the resin film is obtained by stretching the unstretched film at a stretching temperature of 95 to 135° C., a stretching ratio of 1.2 to 10, and a stretching speed of 100 to 30,000 mm/min, and heating the stretched film at a heating temperature of 150 to 240° C. for a heating time of 0.1 to 600 minutes.

Advantageous Effects of Invention

One aspect of the invention thus provides a film capacitor that includes a resin film as a dielectric film, the resin film exhibiting excellent heat resistance, excellent withstand voltage properties, and excellent workability.

DESCRIPTION OF EMBODIMENTS

A film capacitor according to one embodiment of the invention includes a dielectric film and a metal layer.

Dielectric Film

The dielectric film included in the film capacitor according to one embodiment of the invention is a resin film obtained by stretching an unstretched film produced using a crystalline hydrogenated dicyclopentadiene ring-opening polymer, and heating the resulting stretched film, and the resin film has a softening point of 250 to 320° C., a thermal shrinkage ratio of 0.01 to 5.0%, a loss tangent (tan δ) of 0.0001 to 0.0010, and a coefficient of static friction of 0.01 to 1.00. The resin film may be hereinafter referred to as "resin film (I)".

The crystalline hydrogenated dicyclopentadiene ring-opening polymer that is used to produce the resin film (I) is a hydrogenated dicyclopentadiene ring-opening polymer from which a film-shaped formed article having a melting point can be obtained by means of stretching or the like.

Examples of the crystalline hydrogenated dicyclopentadiene ring-opening polymer include the hydrogenated dicyclopentadiene ring-opening polymer having syndiotacticity disclosed in JP-A-2006-52333.

The dicyclopentadiene ring-opening polymer having syndiotacticity may be hereinafter referred to as "polymer (α)", and the polymer (α) that has been hydrogenated may be hereinafter referred to as "polymer (β)".

The polymer (α) is obtained by subjecting dicyclopentadiene to ring-opening polymerization. Dicyclopentadiene is present in the form of an endo-stereoisomer or an exo-stereoisomer. Both the endo-stereoisomer and the exo-stereoisomer can be used as the monomer. Either the endo-stereoisomer or the exo-stereoisomer may be used alone, or an isomer mixture that includes the endo-stereoisomer and the exo-stereoisomer in an arbitrary ratio may be used. Note that it is preferable to increase the ratio of the endo-stereoisomer or the exo-stereoisomer from the viewpoint of improving the crystallinity of the polymer (β), and achieving a further improvement in heat resistance. For example, it is preferable to use the endo-stereoisomer or the exo-stereoisomer in a ratio of 80% or more, more preferably 90% or more, and particularly preferably 95% or more. Note that it is preferable to increase the ratio of the endo-stereoisomer from the viewpoint of ease of synthesis.

The polymer (α) may include a repeating unit other than a repeating unit derived from dicyclopentadiene as long as the polymer (α) can produce the polymer (β) having crystallinity. Such a polymer (α) may be produced by subjecting dicyclopentadiene and a monomer other than dicyclopentadiene to ring-opening copolymerization.

Examples of the monomer other than dicyclopentadiene include a polycyclic norbornene-based compound other than dicyclopentadiene, a bicyclic norbornene-based compound that does not include a cyclic (ring) structure that is fused with the norbornene skeleton, a monocycloolefin, a cyclic diene, and derivatives thereof.

These monomers are normally used in a ratio of more than 0 wt % and 20 wt % or less, and preferably more than 0 wt % and 10 wt % or less, based on the total amount of monomers.

A catalyst that is used to produce the polymer (α) is not particularly limited as long as the polymer (α) can be produced by subjecting dicyclopentadiene to ring-opening copolymerization.

Examples of such a catalyst include a ring-opening polymerization catalyst that includes a metal compound represented by the following formula (1) (hereinafter may be referred to as "metal compound (1)") as a catalytically active component.

$$M(NR^1)X_{4-a}(OR^2)_a \cdot L_b \quad (1)$$

wherein M is a metal atom selected from the transition metal atoms that belong to Group 6 in the periodic table, $R^1$ is a phenyl group that is either unsubstituted or substituted at least one of the positions 3, 4, and 5, or a group represented by —$CH_2R^3$, $R^3$ is a hydrogen atom, or a group selected from a substituted or unsubstituted alkyl group and a substituted or unsubstituted aryl group, $R^2$ is a group selected from a substituted or unsubstituted alkyl group and a substituted or unsubstituted aryl group, X is a halogen atom, or a group selected from an alkyl group, an aryl group, and an alkylsilyl group, L is a neutral electron donor ligand, a is 0 or 1, and b is an integer from 0 to 2, provided that a plurality of X are either identical to or different from each other when a plurality of X are present, and a plurality of L are either identical to or different from each other when a plurality of L are present.

The metal atom (M) included in the metal compound (1) is selected from the transition metal atoms (chromium, molybdenum, and tungsten) that belong to Group 6 in the periodic table. Among these, molybdenum and tungsten are preferable, and tungsten is particularly preferable.

The metal compound (1) includes a metal-imide bond.

$R^1$ is a substituent that is bonded to the nitrogen atom that forms the metal-imide bond.

Examples of a substituent that may substitute the phenyl group represented by $R^1$ that is either unsubstituted or substituted at least one of the positions 3, 4, and 5, include an alkyl group such as a methyl group and an ethyl group; a halogen atom such as a fluorine atom, a chlorine atom, and a bromine atom; an alkoxy group such as a methoxy group, an ethoxy group, and an isopropoxy group; and the like.

Note that substituents that substitute the phenyl group at least two of the positions 3, 4, and 5 may be bonded to each other.

Specific examples of the phenyl group that is either unsubstituted or substituted at least one of the positions 3, 4, and 5, include a phenyl group; a monosubstituted phenyl group such as a 4-methylphenyl group, a 4-chlorophenyl group, a 3-methoxyphenyl group, a 4-cyclohexylphenyl group, and a 4-methoxyphenyl group; a disubstituted phenyl group such as a 3,5-dimethylphenyl group, a 3,5-dichlorophenyl group, a 3,4-dimethylphenyl group, and a 3,5-dimethoxyphenyl group; a trisubstituted phenyl group such as a 3,4,5-trimethylphenyl group and a 3,4,5-trichlorophenyl group; and a substituted or unsubstituted 2-naphthyl group such as a 2-naphthyl group, a 3-methyl-2-naphthyl group, and a 4-methyl-2-naphthyl group.

The number of carbon atoms included in the unsubstituted or substituted alkyl group that may be represented by $R^3$ included in —$CH_2R^3$ that may be represented by $R^1$ is not particularly limited, but is normally 1 to 20, preferably 1 to 10, and more preferably 1 to 4. The alkyl group may be either linear or branched. A substituent that may substitute the alkyl group is not particularly limited. Examples of a substituent that may substitute the alkyl group include a substituted or unsubstituted phenyl group such as a phenyl group and a 4-methylphenyl group; an alkoxy group such as a methoxy group and an ethoxy group; and the like.

Examples of the substituted or unsubstituted aryl group that may be represented by $R^3$ include a phenyl group, a 1-naphthyl group, a 2-naphthyl group, and the like. A substituent that may substitute the aryl group is not particularly limited. Examples of a substituent that may substitute the aryl group include a substituted or unsubstituted phenyl group such as a phenyl group and a 4-methylphenyl group; an alkoxy group such as a methoxy group and an ethoxy group; and the like.

$R^3$ is preferably an alkyl group having 1 to 20 carbon atoms, such as a methyl group, an ethyl group, a propyl group, an isopropyl group, a butyl group, an isobutyl group, a t-butyl group, a pentyl group, a hexyl group, an octyl group, or a decyl group.

The metal compound (1) includes three or four groups selected from a halogen atom, an alkyl group, an aryl group, and an alkylsilyl group. Specifically, X in the formula (1) represents a halogen atom, or a group selected from an alkyl group, an aryl group, and an alkylsilyl group. Note that the metal compound (1) may have a structure in which two or more groups represented by X are bonded to each other.

Examples of the halogen atom that may be represented by X include a chlorine atom, a bromine atom, and an iodine atom. Examples of the alkyl group that may be represented by X include a methyl group, an ethyl group, a propyl group, an isopropyl group, a butyl group, an isobutyl group, a t-butyl group, a pentyl group, a neopentyl group, a benzyl group, a neophyl group, and the like. Examples of the aryl group that may be represented by X include a phenyl group, a 4-methylphenyl group, a 2,6-dimethylphenyl group, a 1-naphthyl group, a 2-naphthyl group, and the like. Examples of the alkylsilyl group that may be represented by X include a trimethylsilyl group, a triethylsilyl group, a t-butyldimethylsilyl group, and the like.

The metal compound (1) may include one metal-alkoxide bond or one metal-aryloxide bond. The substituent ($R^2$ in the formula (1)) that is bonded to the oxygen atom that forms the metal-alkoxide bond or the metal-aryloxide bond is a group selected from a substituted or unsubstituted alkyl group and a substituted or unsubstituted aryl group. Examples of the substituted or unsubstituted alkyl group and the substituted or unsubstituted aryl group that may be represented by $R^2$ include those mentioned above in connection with the substituted or unsubstituted alkyl group and the substituted or unsubstituted aryl group that may be represented by $R^3$.

The metal compound (1) may include one or two neutral electron donor ligands.

Examples of the neutral electron donor ligand (L in the formula (1)) include an electron donor compound that includes an element (atom) among the elements that belong to Group 14 or 15 in the periodic table.

Specific examples of the neutral electron donor ligand include a phosphine such as trimethylphosphine, triisopropylphosphine, tricyclohexylphosphine, and triphenylphosphine; an ether such as diethyl ether, dibutyl ether, 1,2-dimethoxyethane, and tetrahydrofuran; an amine such as trimethylamine, triethylamine, pyridine, and lutidine; and the like. Among these, an ether is preferable.

The metal compound (1) is preferably a tungsten compound that includes a phenylimide group (i.e., the compound represented by the formula (1) wherein M is a tungsten atom, and $R^1$ is a phenyl group), and more preferably tetrachlorotungsten phenylimide-(tetrahydrofuran).

The metal compound (1) may be synthesized by mixing an oxyhalogenated product of a Group 6 transition metal, a phenyl isocyanate that is either unsubstituted or substituted at least one of the positions 3, 4, and 5, or a monosubstituted methyl isocyanate, and a neutral electron donor ligand (L) optionally together with an alcohol, a metal alkoxide, or a metal aryloxide (e.g., the method disclosed in JP-A-5-345817), for example. The metal compound (1) thus synthesized may be purified and isolated by means of crystallization or the like, and used for the ring-opening polymerization reaction, or the resulting mixture may be used directly as the catalyst solution without purifying the mixture.

The metal compound (1) (ring-opening polymerization catalyst) is used in such an amount that the molar ratio (metal compound (1):monomer(s)) of the metal compound (1) to the monomer(s) is normally 1:100 to 1:2,000,000, preferably 1:500 to 1:1,000,000, and more preferably 1:1,000 to 1:500,000. If the amount of the catalyst is too large, it may be difficult to remove the catalyst. If the amount of the catalyst is too small, sufficient polymerization activity may not be obtained.

The metal compound (1) may be used alone, or may be used in combination with an organometallic reducing agent, when effecting ring-opening polymerization using the metal compound (1). It may be possible to improve the polymerization activity by utilizing the metal compound (1) in combination with the organometallic reducing agent.

Examples of the organometallic reducing agent include a compound that includes a hydrocarbon group having 1 to 20 carbon atoms, and an element among the elements that respectively belong to Groups 1, 2, 12, 13, and 14 in the periodic table. It is preferable to use an organolithium, an organomagnesium, an organozinc, an organoaluminum, or an organotin. It is particularly preferable to use an organoaluminum or an organotin.

Examples of the organolithium include methyllithium, n-butyllithium, phenyllithium, and the like. Examples of the organomagnesium include butylethylmagnesium, butyloctylmagnesium, dihexylmagnesium, ethylmagnesium chloride, n-butylmagnesium chloride, allylmagnesium bromide, and the like. Examples of the organozinc include dimethylzinc, diethylzinc, diphenylzinc, and the like. Examples of the organoaluminum include trimethylaluminum, triethylaluminum, triisobutylaluminum, diethylaluminum chloride, ethylaluminum sesquichloride, ethylaluminum dichloride, diethylaluminum ethoxide, diisobutylaluminum isobutoxide, ethylaluminum diethoxide, isobutylaluminum diisobutoxide, and the like. Examples of the organotin include tetramethyltin, tetra(n-butyl)tin, tetraphenyltin, and the like.

The organometallic reducing agent is preferably used in an amount of 0.1 to 100-fold mol, more preferably 0.2 to 50-fold mol, and particularly preferably 0.5 to 20-fold mol, based on the metal compound (1). If the amount of the organometallic reducing agent is too small, the polymerization activity may not be improved. If the amount of the organometallic reducing agent is too large, a side reaction may easily occur.

The ring-opening polymerization reaction is normally effected in an organic solvent.

The organic solvent is not particularly limited as long as the organic solvent can dissolve or disperse the desired polymer ($\alpha$) and polymer ($\beta$) under specific conditions, and does not hinder the polymerization reaction and the hydrogenation reaction.

Specific examples of the organic solvent include an aliphatic hydrocarbon such as pentane, hexane, and heptane; an alicyclic hydrocarbon such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene, and cyclooctane; an aromatic hydrocarbon such as benzene, toluene, and xylene; a halogen-containing aliphatic hydrocarbon such as dichloromethane, chloroform, and 1,2-dichloroethane; a halogen-containing aromatic hydrocarbon such as chlorobenzene and dichlorobenzene; a nitrogen-containing hydrocarbon-based solvent such as nitromethane, nitrobenzene, and acetonitrile;

an ether such as diethyl ether and tetrahydrofuran; and a mixed solvent thereof. Among these, an aromatic hydrocarbon, an aliphatic hydrocarbon, an alicyclic hydrocarbon, and an ether are preferably used.

The ring-opening polymerization reaction may be initiated by mixing the monomer and the metal compound (1) optionally together with the organometallic reducing agent. These components may be added in an arbitrary order. For example, a mixture that includes the metal compound (1) and the organometallic reducing agent may be added to the monomer, and the resulting mixture may be mixed, or a mixture that includes the monomer and the metal compound (1) may be added to the organometallic reducing agent, and the resulting mixture may be mixed, or the metal compound (1) may be added to a mixture that includes the monomer and the organometallic reducing agent, and the resulting mixture may be mixed.

Each component may be added at a time, or may be added stepwise.

The monomer concentration when initiating the ring-opening polymerization reaction is not particularly limited, but is preferably 1 to 50 wt %, more preferably 2 to 45 wt %, and particularly preferably 3 to 40 wt %. If the monomer concentration is too low, the productivity of the polymer ($\alpha$) may decrease. If the monomer concentration is too high, the viscosity of the polymer solution may increase to a large extent, and it may be difficult to effect the subsequent hydrogenation reaction.

An activity modifier may be added to the polymerization system. The activity modifier is used to stabilize the ring-opening polymerization catalyst, and adjust the rate of the polymerization reaction and the molecular weight distribution of the polymer.

The activity modifier is not particularly limited as long as the activity modifier is an organic compound that includes a functional group. An oxygen-containing organic compound, a nitrogen-containing organic compound, and a phosphorus-containing organic compound are preferable as the activity modifier. Specific examples of the activity modifier include an ether such as diethyl ether, diisopropyl ether, dibutyl ether, anisole, furan, and tetrahydrofuran; a ketone such as acetone, benzophenone, and cyclohexanone; an ester such as ethyl acetate; a nitrile such as acetonitrile and benzonitrile; an amine such as triethylamine, triisopropylamine, quinuclidine, and N,N-diethylaniline; pyridine and derivatives thereof such as pyridine, 2,4-lutidine, 2,6-lutidine, and 2-t-butylpyridine; a phosphine such as triphenylphosphine and tricyclohexylphosphine; a phosphate such as trimethyl phosphate and triphenyl phosphate; a phosphine oxide such as triphenylphosphine oxide; and the like. These activity modifiers may be used either alone or in combination.

The activity modifier may be used in an arbitrary amount. The activity modifier may normally be used in a ratio of 0.01 to 100 mol % based on the metal compound (1) that is used as the ring-opening polymerization catalyst.

A molecular weight modifier may be added to the polymerization system in order to adjust the molecular weight of the polymer ($\alpha$).

Examples of the molecular weight modifier include an $\alpha$-olefin such as 1-butene, 1-pentene, 1-hexene, and 1-octene; an aromatic vinyl compound such as styrene and vinyltoluene; an oxygen-containing vinyl compound such as ethyl vinyl ether, isobutyl vinyl ether, allyl glycidyl ether, allyl acetate, allyl alcohol, and glycidyl methacrylate; a halogen-containing vinyl compound such as arylchloride; a nitrogen-containing vinyl compound such as acrylamide; a non-conjugated diene such as 1,4-pentadiene, 1,4-hexadiene, 1,5-hexadiene, 1,6-heptadiene, 2-methyl-1,4-pentadiene, and 2,5-dimethyl-1,5-hexadiene; a conjugated diene such as 1,3-butadiene, 2-methyl-1,3-butadiene, 2,3-dimethyl-1,3-butadiene, 1,3-pentadiene, and 1,3-hexadiene; and the like.

The molecular weight modifier may be used in an appropriate amount taking account of the desired molecular weight. The molecular weight modifier may normally be used in a ratio of 0.1 to 50 mol % based on the monomer.

The polymerization temperature is not particularly limited, but is normally −78 to +200° C., and preferably −30 to +180° C. The polymerization time is not particularly limited, and is determined taking account of the reaction scale. The polymerization time is normally 1 minute to 1,000 hours.

The polymer ($\alpha$) can be efficiently produced by subjecting the monomer including dicyclopentadiene to ring-opening polymerization under the above conditions using the ring-opening polymerization catalyst that includes the metal compound (1).

The ratio of racemo diads (i.e., the degree of syndiotacticity) in the polymer ($\alpha$) is normally 60% or more, preferably 65% or more, and more preferably 70 to 99%. The ratio of racemo diads in the polymer ($\alpha$) can be adjusted by appropriately selecting the type of ring-opening polymerization catalyst, for example.

The weight average molecular weight (Mw) of the polymer ($\alpha$) is not particularly limited, but is normally 10,000 to 100,000, and preferably 15,000 to 80,000. The polymer ($\beta$) obtained by hydrogenating the polymer ($\alpha$) having a weight average molecular weight within the above range exhibits better formability. A resin film obtained by forming the polymer ($\beta$) exhibits better heat resistance.

The weight average molecular weight of the polymer ($\alpha$) can be adjusted by adjusting the amount of the molecular weight modifier that is used when effecting polymerization, for example.

The molecular weight distribution (Mw/Mn) of the polymer ($\alpha$) is not particularly limited, but is normally 4.0 or less, and preferably 3.5 or less. The polymer ($\beta$) obtained by hydrogenating the polymer ($\alpha$) having a molecular weight distribution within the above range exhibits better formability.

The molecular weight distribution of the polymer ($\alpha$) can be adjusted by appropriately selecting the monomer addition method, or adjusting the monomer concentration when effecting the ring-opening polymerization reaction.

The weight average molecular weight (Mw) and the molecular weight distribution (Mw/Mn) refer to standard polystyrene-equivalent values determined by gel permeation chromatography (eluent: tetrahydrofuran).

The polymer ($\beta$) can be produced by hydrogenating the polymer ($\alpha$) (i.e., hydrogenating the carbon-carbon unsaturated bonds included in the polymer ($\alpha$)).

The polymer ($\alpha$) may be hydrogenated by supplying hydrogen to the reaction system in the presence of a hydrogenation catalyst, for example. The hydrogenation catalyst is not particularly limited. A homogeneous catalyst or a heterogeneous catalyst that is commonly used when hydrogenating an olefin compound may be appropriately used as the hydrogenation catalyst.

Examples of the homogeneous catalyst include a catalyst system that includes a transition metal compound and an alkali metal compound in combination, such as cobalt acetate and triethylaluminum, nickel acetylacetonate and triisobutylaluminum, titanocene dichloride and n-butyllithium, zirconocene dichloride and sec-butyllithium, and tetrabutoxytitanate and dimethylmagnesium, and a noble metal complex catalyst such as dichlorobis(triphenylphosphine)palladium, chlorohydridocarbonyltris(triphenylphosphine)ruthenium, bis(tricyclohexylphosphine)benzylidyne ruthenium(IV) dichloride, and chlorotris(triphenylphosphine)rhodium.

Examples of the heterogeneous catalyst include nickel, palladium, platinum, rhodium, ruthenium, and a solid catalyst in which nickel, palladium, platinum, rhodium, or ruthenium is supported on a carrier (e.g., carbon, silica, diatomaceous earth, alumina, and titanium oxide), such as nickel/silica, nickel/diatomaceous earth, nickel/alumina, palladium/carbon, palladium/silica, palladium/diatomaceous earth, and palladium/alumina.

The hydrogenation reaction is normally effected in an inert organic solvent. Examples of the inert organic solvent include an aromatic hydrocarbon such as benzene and toluene; an aliphatic hydrocarbon such as pentane and hexane; an alicyclic hydrocarbon such as cyclohexane and decahydronaphthalene; an ether such as tetrahydrofuran and ethylene glycol dimethyl ether; and the like. The inert organic solvent may normally be the same as the solvent used when effecting the polymerization reaction. Specifically, the hydrogenation catalyst may be added directly to the polymer solution, and the hydrogenation reaction may be effected using the mixture.

Preferable hydrogenation reaction conditions differ depending on the type of hydrogenation catalyst. The reaction temperature is normally −20 to +250° C., preferably −10 to +220° C., and more preferably 0 to 200° C. If the reaction temperature is too low, the reaction rate may be too low. If the reaction temperature is too high, a side reaction may occur.

The hydrogen pressure is normally set to 0.01 to 20 MPa, preferably 0.05 to 15 MPa, and more preferably 0.1 to 10 MPa. If the hydrogen pressure is too low, the hydrogenation rate may decrease to a large extent. If the hydrogen pressure is too high, it may be necessary to use a reactor that can endure high pressure (i.e., the reaction equipment may be limited). The reaction time is not particularly limited, but is normally 0.1 to 10 hours.

The hydrogenation rate (i.e., the ratio of main-chain double bonds that have been hydrogenated) to be achieved by the hydrogenation reaction is not particularly limited, but is preferably 70% or more, more preferably 80% or more, particularly preferably 90% or more, and most preferably 99% or more. The heat resistance of the polymer ($\beta$) increases as the hydrogenation rate increases.

The syndiotacticity of the polymer ($\alpha$) that has been subjected to the hydrogenation reaction is normally maintained. Therefore, the polymer ($\beta$) has syndiotacticity. The ratio of racemo diads in the polymer ($\beta$) is not particularly limited as long as the polymer ($\beta$) has crystallinity, but is normally 60% or more, preferably 65% or more, and more preferably 70 to 99%.

The ratio of racemo diads in the polymer ($\beta$) can be quantitatively determined by measuring the $^{13}$C-NMR spectrum of the polymer ($\beta$), and analyzing the spectral data. For example, the ratio of racemo diads in the polymer ($\beta$) may be determined by subjecting the polymer ($\beta$) to $^{13}$C-NMR measurement at 200° C. using a mixed solvent that includes 1,2,4-trichlorobenzene-$d_3$ and o-dichlorobenzene-$d_4$, and calculating the ratio of racemo diads from the intensity ratio of the signal at 43.35 ppm that is attributed to meso diads to the signal at 43.43 ppm that is attributed to racemo diads.

The polymer ($\beta$) has crystallinity (i.e., produces a film-shaped formed article that has a melting point). The melting point range is not particularly limited, but is normally 260 to 275° C.

The polymer ($\beta$) having a melting point within the above range exhibits formability and heat resistance in a further well-balanced manner. The melting point of the polymer ($\beta$) can be adjusted by adjusting the degree of syndiotacticity (i.e., the ratio of racemo diads) of the polymer ($\beta$), or appropriately selecting the type of monomer, for example.

When producing the unstretched film using the polymer ($\beta$), only the polymer ($\beta$) may be used as a raw material resin, or a resin composition that includes the polymer ($\beta$) and an additive may be used.

Examples of the additive include an antioxidant such as a phenol-based antioxidant, a phosphorus-based antioxidant, and a sulfur-based antioxidant; a light stabilizer such as a hindered amine-based light stabilizer; a wax such as a petroleum-based wax, a Fischer-Tropsch wax, and a polyalkylene wax; a nucleator such as a sorbitol-based compound, a metal salt of an organophosphoric acid, a metal salt of an organic carboxylic acid, kaolin, and talc; a fluorescent whitening agent such as a diaminostilbene derivative, a coumarin derivative, an azole-based derivative (e.g., benzoxazole derivative, benzotriazole derivative, benzimidazole derivative, and benzothiazole derivative), a carbazole derivative, a pyridine derivative, a naphthalic acid derivative, and an imidazolone derivative; a UV absorber such as a benzophenone-based UV absorber, a salicylate-based UV absorber, and a benzotriazole-based UV absorber; an inorganic filler such as talc, silica, calcium carbonate, and glass fibers; a colorant; a flame retardant; a flame retardant promoter; an antistatic agent; a plasticizer; a near-infrared absorber; a lubricant; a filler; a polymer material other than the polymer ($\beta$), such as a soft polymer; and the like.

The additive may be added in an arbitrary amount as long as the advantageous effects of the invention are not impaired. The additive may be added in an appropriate amount taking account of the object. The resin composition normally includes the additive in a ratio of 0.001 to 5 parts by weight, and preferably 0.01 to 1 part by weight, based on 100 parts by weight of the polymer ($\beta$).

The unstretched film may be produced using an arbitrary method. A known forming method may be appropriately used to produce the unstretched film.

Examples of the forming method include an injection forming method, an extrusion forming method, a press forming method, an inflation forming method, a blow forming method, a calendering method, a cast forming method, a compression forming method, and the like. It is preferable to use an extrusion forming method since it is possible to easily control the thickness of the unstretched film.

When producing the unstretched film using an extrusion forming method, the cylinder temperature (molten resin temperature) is normally set to 250 to 330° C., and preferably 260 to 310° C., the casting roll temperature is normally set to 45 to 160° C., and preferably 45 to 130° C., and the cooling roll temperature is normally set to 25 to 150° C., and preferably 45 to 120° C.

The thickness of the unstretched film is not particularly limited, but is normally 1 µm to 1 mm, and preferably 10 to 500 µm.

The unstretched film is stretched, and heated.

The unstretched film may be stretched using an arbitrary stretching method. A known method may be appropriately used to stretch the unstretched film.

Examples of the stretching method include a uniaxial stretching method such as a method that uniaxially stretches the film in the machine direction by utilizing the difference in circumferential speed between rolls, or a method that uniaxially stretches the film in the transverse direction using a tenter-type stretching machine; a biaxial stretching method such as a simultaneous biaxial stretching method that stretches the film in the machine direction by increasing the interval between holding clips while stretching the film in the transverse direction by utilizing the spread angle of a guide rail, or a successive biaxial stretching method that stretches the film in the machine direction by utilizing the difference in circumferential speed between rolls, and stretches the film in the transverse direction using a tenter-type stretching machine while holding each end of the film using a clip; a method that continuously stretches the film diagonally at an arbitrary angle $\theta$ with respect to the widthwise direction of the film using a tenter-type stretching machine that can apply a feeding force, a tensile force, or a take-up force that differs in speed in the transverse direction or the machine direction; and the like.

The stretching temperature is normally 95 to 135° C., and preferably 100 to 130° C. When the stretching temperature is 95° C. or more, it is possible to reduce or suppress the occurrence of a problem in which the film breaks during stretching, or a decrease in productivity occurs due to unclipping. When the stretching temperature is 135° C. or less, it is possible to efficiently produce a resin film having a small thermal shrinkage ratio.

The stretching ratio is normally set to 1.2 to 10, and preferably 1.5 to 5. When the stretching ratio is set to 1.2 or more, it is possible to efficiently produce a resin film having a high softening point. When the stretching ratio is set to 10 or less, it is possible to efficiently produce a resin film that exhibits excellent toughness. When a biaxial stretching method is used, the stretching ratio is defined by the product of the stretching ratio in the machine direction and the stretching ratio in the transverse direction.

The stretching speed is normally set to 100 to 30,000 mm/min, and preferably 1,000 to 20,000 mm/min. When the stretching speed is set to 100 mm/min or more, it is possible to efficiently produce a resin film (I) having a high softening point. When the stretching speed is set to 30,000 mm/min or less, it is possible to reduce or suppress the occurrence of a problem in which the film breaks during stretching, or a decrease in productivity occurs due to unclipping.

The stretched film obtained by stretching the unstretched film may be heated using an arbitrary heating method. A known method may be appropriately used to heat the stretched film.

Examples of the heating method include a method that secures the stretched film on a stage, and heats the stretched film using a heating device such as a heat treatment oven or an infrared heater.

The heating temperature is normally 150 to 240° C., and preferably 160 to 210° C. When the heating temperature is 150 to 240° C., it is possible to efficiently produce a resin film (I) having a small thermal shrinkage ratio.

The heating time is normally 0.1 to 600 minutes, and preferably 3 to 300 minutes. When the heating time is 0.1 minutes or more, it is possible to efficiently produce a resin film (I) having a small thermal shrinkage ratio. When the heating time is 600 minutes or less, it is possible to efficiently produce a resin film (I) having a small loss tangent (tan $\delta$).

The thickness of the film obtained as described above is not particularly limited, but is normally 1 to 200 μm and preferably 2 to 150 μm.

A film having a thickness within the above range is preferably used as the dielectric film of a film capacitor.

The resin film (I) is obtained by stretching the unstretched film produced using the crystalline hydrogenated dicyclopentadiene ring-opening polymer, and heating the resulting stretched film, and has a softening point of 250 to 320° C., a thermal shrinkage ratio of 0.01 to 5.0% when heated at 200° C. for 10 minutes, a loss tangent (tan $\delta$) of 0.0001 to 0.0010, and a coefficient of static friction of 0.01 to 1.00.

The resin film (I) has a softening point of 250 to 320° C., and preferably 250 to 300° C.

If the softening point of the resin film (I) is too low, the resin film (I) tends to have a high coefficient of static friction, and exhibit inferior workability when used to produce the film capacitor. On the other hand, it is normally difficult to obtain a resin film (I) having a softening point of more than 320° C.

The softening point of the resin film (I) can be increased by increasing the stretching ratio or the stretching speed when stretching the unstretched film, for example. There is a tendency that a resin film (I) having a higher softening point is obtained when a polymer ($\beta$) having a high racemo diad ratio or a high hydrogenation rate is used.

The resin film (I) has a thermal shrinkage ratio of 0.01 to 5.0%, and preferably 0.1 to 4.9%, when heated at 200° C. for 10 minutes.

A resin film (I) having too large a thermal shrinkage ratio may exhibit inferior heat resistance. On the other hand, it is normally difficult to obtain a resin film (I) having a thermal shrinkage ratio of less than 0.01%.

The thermal shrinkage ratio of the resin film (I) can be reduced by stretching the unstretched film at a moderate stretching temperature (i.e., a stretching temperature that is not too high), or heating the stretched film at an appropriate temperature for an appropriate time, for example.

The resin film (I) has a loss tangent (tan $\delta$) of 0.0001 to 0.0010.

A resin film (I) having a loss tangent (tan $\delta$) of more than 0.0010 may exhibit inferior withstand voltage properties. On the other hand, it is normally difficult to obtain a resin film (I) having a loss tangent (tan $\delta$) of less than 0.0001.

The loss tangent (tan $\delta$) of the resin film (I) can be decreased by avoiding a situation in which the stretched film is heated for a long time, for example. It is possible to produce a resin film (I) having a smaller loss tangent (tan $\delta$) by reducing the content of a metal included in the polymer ($\beta$) as impurities.

The resin film (I) has a coefficient of static friction of 0.01 to 1.00, and preferably 0.10 to 0.90.

A resin film (I) having a coefficient of static friction of more than 1.00, or a resin film (I) having a coefficient of static friction of less than 0.01, may exhibit inferior workability.

The coefficient of static friction of the resin film (I) can be reduced by increasing the stretching ratio or the stretching speed when stretching the unstretched film, or heating the stretched film at an appropriate temperature for an appropriate time, for example. A resin film (I) having a smaller coefficient of static friction can be produced when a polymer ($\beta$) having a high racemo diad ratio or a high hydrogenation rate is used.

The resin film (I) having the above properties exhibits excellent heat resistance, excellent withstand voltage properties, and excellent workability.

For example, the resin film (I) rarely shrinks or softens (i.e., maintains its shape) even when heated at 220° C. for 10 minutes.

The breakdown voltage measured when the resin film (I) is subjected to a dielectric breakdown test is normally 400 kV/mm or more.

Since the resin film (I) has a moderate coefficient of static friction, high efficiency is achieved when winding a long resin film (I) in the form of a roll, or unwinding the resin film (I) that has been wound in the form of a roll, or producing a wound-type film capacitor.

Since the resin film (I) has the above properties, the resin film (I) may be used as a dielectric film of a film capacitor.

A dielectric film may be produced using the resin film (I) by cutting the resin film (I) so as to have a specific size, or subjecting the resin film (I) to a surface treatment (e.g., corona treatment and plasma treatment), and cutting the resulting film so as to have a specific size, for example.

Metal Layer

The metal layer that is included in the film capacitor according to one embodiment of the invention is not particularly limited. A metal layer (electrode layer) that is used for a known film capacitor may be used as the metal layer that is included in the film capacitor according to one embodiment of the invention.

The metal that forms the metal layer is not particularly limited as long as the metal is a conductive metal. Examples of the metal that forms the metal layer include aluminum, zinc, gold, platinum, copper, and the like.

The metal layer may be formed using a foil formed of the above metal. A deposited metal film obtained by depositing a metal on the surface of the dielectric film (resin film (I)) may be used as the metal layer.

When the metal layer is formed using a metal foil, the thickness of the metal layer is not particularly limited, but is normally 0.1 to 100 μm, preferably 1 to 50 μm, and more preferably 3 to 15 μm.

When the metal layer is a deposited metal film, the thickness of the metal layer is not particularly limited, but is normally 10 to 200 nm, and preferably 20 to 100 nm.

It is preferable to use a deposited metal film as the metal layer since it is possible to efficiently form a metal layer that exhibits excellent adhesion to the dielectric film, and produce a film capacitor that has a reduced size and excellent durability.

When a deposited metal film is used as the metal layer, the deposited metal film may be formed using an arbitrary method. A vacuum deposition method, a sputtering method, an ion plating method, or the like may be appropriately used to form the deposited metal film.

The deposited metal film may be a single-layer film, or may be a multi-layer film. Examples of the multi-layer deposited metal film include the deposited metal film disclosed JP-A-2-250360.

Film Capacitor

The film capacitor according to one embodiment of the invention includes the dielectric film and the metal layer.

The film capacitor according to one embodiment of the invention may have an arbitrary structure as long as the resin film (I) is used as the dielectric film.

Examples of the film capacitor according to one embodiment of the invention include a stacked-type film capacitor in which dielectric films and metal layers are alternately stacked (see JP-A-63-181411 and JP-A-3-18113, for example); a wound-type film capacitor in which a tape-shaped dielectric film and a tape-shaped metal layer are wound (see JP-A-60-262414 and JP-A-3-286514, for example); and the like.

The film capacitor according to one embodiment of the invention may be produced using an arbitrary method. A known method may be used to produce the film capacitor according to one embodiment of the invention.

The film capacitor according to one embodiment of the invention includes the resin film that exhibits excellent heat resistance, excellent withstand voltage properties, and excellent workability, as the dielectric film.

Accordingly, the film capacitor according to one embodiment of the invention can be reduced in size, exhibits excellent heat resistance and excellent durability, and can be produced on an industrial scale while reducing the occurrence of defective products.

EXAMPLES

The invention is further described below by way of examples and comparative examples. Note that the invention is not limited to the following examples. The units "parts" and "%" used in connection with the examples respectively refer to "parts by weight" and "wt %" unless otherwise indicated.

The properties of the dicyclopentadiene ring-opening polymer and the like were measured as described below.
(1) Molecular Weight (Weight Average Molecular Weight and Number Average Molecular Weight) of Dicyclopentadiene Ring-Opening Polymer The molecular weight (standard polystyrene-equivalent molecular weight) of the dicyclopentadiene ring-opening polymer was determined by gel permeation chromatography (GPC) (eluent: tetrahydrofuran).

The molecular weight of the dicyclopentadiene ring-opening polymer was determined at 40° C. using a GPC system ("HLC-8320" manufactured by Tosoh Corporation) and an H-type column (manufactured by Tosoh Corporation).

(2) Hydrogenation Rate of Hydrogenated Dicyclopentadiene Ring-Opening Polymer

The hydrogenated dicyclopentadiene ring-opening polymer was subjected to $^1$H-NMR measurement, and the hydrogenation rate of the hydrogenated dicyclopentadiene ring-opening polymer was calculated.
(3) Ratio of Racemo Diads in Hydrogenated Dicyclopentadiene Ring-Opening Polymer The hydrogenated dicyclopentadiene ring-opening polymer was subjected to $^{13}$C-NMR measurement 200° C. using a mixed solvent including 1,2,4-trichlorobenzene-$d_3$ and o-dichlorobenzene-$d_4$ by applying an inverse-gated decoupling method, and the ratio of racemo diads in the hydrogenated dicyclopentadiene ring-opening polymer was calculated based on the intensity ratio of the signal at 43.35 ppm that is attributed to meso diads to the signal at 43.43 ppm that is attributed to racemo diads using the peak (127.5 ppm) of o-dichlorobenzene-$d_4$ as a reference shift.
(4) Softening Point of Resin Film The resin film was cut in an arbitrary area to obtain a circular measurement sample having a diameter of 5 mm. The measurement sample was heated at a heating rate of 10° C./min using a thermomechanical analyzer ("SS6100" manufactured by Hitachi High-Tech Science Corporation) to measure the softening point of the resin film.
(5) Thermal Shrinkage Ratio of Resin Film The resin film was cut in an arbitrary area to obtain a 500×500 mm square measurement sample. The measurement sample was prepared so that each side of the square measurement sample coincided with the machine direction (MD direction) and the transverse direction (TD direction) when the resin film was produced.

The measurement sample was heated at 200° C. for 10 minutes using an oven, and the amount of change in length in the MD direction and the TD direction due to heating was determined to calculate the thermal shrinkage ratio of the resin film. Note that the thermal shrinkage ratio of the resin film refers to the average value of the thermal shrinkage ratio in the MD direction and the thermal shrinkage ratio in the TD direction.
(6) Loss Tangent (Tan δ) of Resin Film The resin film was cut in an arbitrary area to obtain a measurement sample having a size of 150×1 mm. The loss tangent (tan δ) of the measurement sample at a frequency of 1 GHz was measured using a network analyzer ("N5230A" manufactured by Agilent Technologies).
(7) Coefficient of Static Friction of Resin Film The coefficient of static friction between the resin film and a ball indenter was measured in accordance with ASTM D1894 using a TriboGear friction tester ("TYPE 38" manufactured by Shinto Scientific Co., Ltd.). The load was set to 200 g, and the speed was set to 100 mm/mm.
(8) Heat Resistance of Resin Film The resin film was cut in an arbitrary area to obtain a 500×500 mm square measurement sample.

The measurement sample was heated at 220° C. for 10 minutes using an oven, and the shape of the measurement sample that had been heated was observed with the naked eye. The heat resistance of the resin film was evaluated in accordance with the following standard.
Good: The shape of the measurement sample was maintained.
Bad: A change in shape due to thermal shrinkage or softening was observed.

(9) Withstand Voltage Properties of Resin Film (Measurement of Breakdown Voltage)

The breakdown voltage was measured with respect to the resin film using a breakdown voltage tester ("YST-243-100RHO" manufactured by Yamayo Shikenki) to determine the withstand voltage properties of the resin film.

(10) Workability of Resin Film

Two resin films were placed one on top of the other, and a weight (100 g) was placed thereon. The state of the resin films was observed while sliding one of the resin films horizontally at a speed of 10 mm/sec, and the workability of the resin film was evaluated in accordance with the following standard.

Good: Only the resin film that was slid moved smoothly.
Bad: The resin film did not moved smoothly, or the two resin films moved at the same time.

Production Example 1

A pressure-resistant reaction vessel made of a metal in which the internal atmosphere had been replaced by nitrogen, was charged with 154.5 parts of cyclohexane, 42.8 parts (amount of dicyclopentadiene: 30 parts) of a solution (concentration: 70%) prepared by dissolving dicyclopentadiene (endo-stereoisomer content: 99% or more) in cyclohexane, and 1.9 parts of 1-hexene, and the mixture was heated to 53° C. with stirring.

Separately, 0.061 parts of a solution (concentration: 19%) prepared by dissolving diethylaluminum ethoxide in n-hexane was added to a solution prepared by dissolving 0.014 parts of a tetrachlorotungsten phenylimide-(tetrahydrofuran) complex in 0.70 parts of toluene, and the mixture was stirred for 10 minutes to prepare a catalyst solution.

The catalyst solution was added to the reaction vessel with stirring to initiate a ring-opening polymerization reaction, and the ring-opening polymerization reaction was effected for 4 hours while maintaining the mixture at 53° C. After the addition of 0.037 parts of 1,2-ethanediol (terminator) to the reaction vessel, the mixture was heated to 60° C., and stirred for 1 hour to terminate the polymerization reaction.

The number average molecular weight (Mn) and the weight average molecular weight (Mw) of the dicyclopentadiene ring-opening polymer included in the reaction solution were respectively 8,750 and 28,100, and the molecular weight distribution (Mw/Mn) was 3.21.

After the addition of 1 part of a hydrotalcite-like compound ("Kyowaad (registered trademark) 2000" manufactured by Kyowa Chemical Industry Co., Ltd.) (adsorbent) to the reaction solution, the mixture was heated to 60° C., and stirred for 1 hour. After the addition of 0.4 parts of a filter aid ("Radiolite (registered trademark) #1500" manufactured by Showa Chemical Industry Co., Ltd.) to the mixture, the adsorbent was filtered off using a PP pleated cartridge filter ("TCP-HX" manufactured by Advantec Toyo Kaisha, Ltd.).

After the addition of 100 parts of cyclohexane and 0.0043 parts of chlorohydridocarbonyltris(triphenylphosphine)ruthenium to 200 parts of the solution including the dicyclopentadiene ring-opening polymer (amount of polymer: 30 parts), a hydrogenation reaction was effected at 180° C. for 4 hours under a hydrogen pressure of 6 MPa. A slurry in which the polymer precipitated was thus obtained.

The slurry was centrifuged to separate the hydrogenated dicyclopentadiene ring-opening polymer from the solution, and the hydrogenated dicyclopentadiene ring-opening polymer was filtered off. The hydrogenated dicyclopentadiene ring-opening polymer was dried at 60° C. for 24 hours under reduced pressure to obtain 28.5 parts of a crystalline hydrogenated dicyclopentadiene ring-opening polymer.

The hydrogenation rate of the hydrogenated dicyclopentadiene ring-opening polymer was 99% or more, the melting point (Tm) of the hydrogenated dicyclopentadiene ring-opening polymer was 262° C., and the ratio of racemo diads in the hydrogenated dicyclopentadiene ring-opening polymer was 89%.

Production Example 2

1.1 parts of tetrakis[methylene-3-(3',5'-di-t-butyl-4'-hydroxyphenyl)propionate]methane ("Irganox (registered trademark) 1010" manufactured by BASF Japan Ltd.) (antioxidant) was mixed with 100 parts of the hydrogenated dicyclopentadiene ring-opening polymer obtained in Production Example 1 to obtain a raw material composition. The raw material composition was introduced into a twin-screw extruder ("TEM-37B" manufactured by Toshiba Machine Co., Ltd.) provided with four die holes (inner diameter: 3 mm), and extruded using a hot melt extrusion forming method to obtain a strand-like formed article, which was cooled, and cut using a strand cutter to obtain resin pellets.

The twin-screw extruder was operated under the following conditions.
Barrel temperature: 270 to 280° C.
Die temperature: 270° C.
Screw rotational speed: 145 rpm
Feeder rotational speed: 50 rpm Production Example 3

The resin pellets obtained in Production Example 2 were formed in the shape of a film having a thickness of 150 μm and a width of 120 mm using a hot melt extrusion film-forming machine provided with a T-die ("Measuring Extruder Type Me-20/2800 V3" manufactured by Optical Control Systems), and the resulting unstretched film was wound in the form of a roll at a speed of 2 m/min.

The film-forming machine was operated under the following conditions.
Barrel temperature: 280 to 290° C.
Die temperature: 270° C.
Screw rotational speed: 30 rpm Example 1

The unstretched film obtained in Production Example 3 was cut in an arbitrary area to prepare a 90×90 mm square film, which was placed in a compact stretching machine ("EX10-B" manufactured by Toyo Seiki Seisaku-sho, Ltd.), and stretched at a stretching temperature of 100° C., a stretching ratio of 2.0×2.0, and a stretching speed of 10,000 mm/min.

The resulting stretched film was secured on an iron plate, and heated at 200° C. for 20 minutes using an oven to obtain a resin film for use as a dielectric film.

The properties of the resulting resin film for use as a dielectric film were measured as described above. The measurement results are listed in Table 1.

Example 2

A resin film for use as a dielectric film was obtained in the same manner as in Example 1, except that the stretching ratio was changed to 3.0×3.0, the stretching speed was changed to 300 mm/min, and the heating temperature was changed to 210° C., and the properties of the resulting resin film for use as a dielectric film were measured as described above. The measurement results are listed in Table 1.

Example 3

A resin film for use as a dielectric film was obtained in the same manner as in Example 1, except that the stretching temperature was changed to 130° C., and the heating temperature was changed to 150° C., and the properties of the resulting resin film for use as a dielectric film were measured as described above. The measurement results are listed in Table 1.

Example 4

A resin film for use as a dielectric film was obtained in the same manner as in Example 1, except that the heating time was changed to 5 minutes, and the properties of the resulting resin film for use as a dielectric film were measured as described above. The measurement results are listed in Table 1.

Example 5

A resin film for use as a dielectric film was obtained in the same manner as in Example 1, except that the stretching ratio was changed to 1.5×1.5, the heating temperature was changed to 230° C., and the heating time was changed to 100 minutes, and the properties of the resulting resin film for use as a dielectric film were measured as described above. The measurement results are listed in Table 1.

Comparative Example 1

A resin film was obtained in the same manner as in Example 1, except that the stretching temperature was changed to 140° C., and the properties of the resulting resin film were measured as described above. The measurement results are listed in Table 1.

Comparative Example 2

A resin film was obtained in the same manner as in Example 1, except that the stretching ratio was changed to 1.1×1.1, and the properties of the resulting resin film were measured as described above. The measurement results are listed in Table 1.

Note that the resin film obtained in Comparative Example 2 was not sufficiently crystallized, and had too low a softening point. Therefore, the thermal shrinkage ratio could not be measured.

Comparative Example 3

A resin film was obtained in the same manner as in Example 1, except that the stretching speed was changed to 80 mm/min, and the properties of the resulting resin film were measured as described above. The measurement results are listed in Table 1.

Note that the resin film obtained in Comparative Example 3 was not sufficiently crystallized, and had too low a softening point. Therefore, the thermal shrinkage ratio could not be measured.

Comparative Example 4

A resin film was obtained in the same manner as in Example 1, except that the heating temperature was changed to 250° C., and the properties of the resulting resin film were measured as described above. The measurement results are listed in Table 1.

Comparative Example 5

A resin film was obtained in the same manner as in Example 1, except that the heating temperature was changed to 140° C., and the properties of the resulting resin film were measured as described above. The measurement results are listed in Table 1.

Comparative Example 6

A resin film was obtained in the same manner as in Example 1, except that the heating time was changed to 0.05 minutes, and the properties of the resulting resin film were measured as described above. The measurement results are listed in Table 1.

Comparative Example 7

A resin film was obtained in the same manner as in Example 1, except that the heating time was changed to 700 minutes, and the properties of the resulting resin film were measured as described above. The measurement results are listed in Table 1.

TABLE 1

| | | Example | | | | | Comparative Example | |
|---|---|---|---|---|---|---|---|---|
| | | 1 | 2 | 3 | 4 | 5 | 1 | 2 |
| Stretching | Stretching temperature (° C.) | 100 | 100 | 130 | 100 | 100 | 140 | 100 |
| | Stretching ratio | 2.0 × 2.0 | 3.0 × 3.0 | 2.0 × 2.0 | 2.0 × 2.0 | 1.5 × 1.5 | 2.0 × 2.0 | 1.1 × 1.1 |
| | Stretching speed (mm/min) | 10,000 | 300 | 10,000 | 10,000 | 10,000 | 10,000 | 10,000 |
| Heating | Heating temperature (° C.) | 200 | 210 | 150 | 200 | 230 | 200 | 200 |
| | Heating time (min) | 20 | 20 | 20 | 5 | 100 | 20 | 20 |

TABLE 1-continued

| | | | | | | | |
|---|---|---|---|---|---|---|---|
| Softening point (° C.) | 260 | 260 | 260 | 260 | 260 | 260 | 208 |
| Thermal shrinkage ratio | 1.1 | 4.8 | 3.4 | 2.2 | 4.8 | 5.2 | — |
| Loss tangent (tanδ) | 0.0004 | 0.0004 | 0.0004 | 0.0003 | 0.0006 | 0.0004 | 0.0004 |
| Coefficient of static friction | 0.53 | 0.89 | 0.71 | 0.52 | 0.61 | 0.55 | 1.2 |
| Evaluation of heat resistance | Good | Good | Good | Good | Good | Bad | Bad |
| Evaluation of withstand voltage properties (breakdown voltage: kV/mm) | 410 | 405 | 420 | 403 | 425 | 411 | 413 |
| Evaluation of workability (ease of slippage) | Good | Good | Good | Good | Good | Good | Bad |

| | | Comparative Example | | | | |
|---|---|---|---|---|---|---|
| | | 3 | 4 | 5 | 6 | 7 |
| Stretching | Stretching temperature (° C.) | 100 | 100 | 100 | 100 | 100 |
| | Stretching ratio | 2.0 × 2.0 | 2.0 × 2.0 | 2.0 × 2.0 | 2.0 × 2.0 | 2.0 × 2.0 |
| | Stretching speed (mm/min) | 80 | 10,000 | 10,000 | 10,000 | 10,000 |
| Heating | Heating temperature (° C.) | 200 | 250 | 140 | 200 | 200 |
| | Heating time (min) | 20 | 20 | 20 | 0.5 | 700 |
| Softening point (° C.) | | 215 | 260 | 260 | 260 | 260 |
| Thermal shrinkage ratio | | — | 5.1 | 5.3 | 6.4 | 2.1 |
| Loss tangent (tanδ) | | 0.0004 | 0.0004 | 0.0004 | 0.0004 | 0.0015 |
| Coefficient of static friction | | 1.1 | 0.54 | 1.1 | 1.2 | 0.50 |
| Evaluation of heat resistance | | Bad | Bad | Bad | Bad | Good |
| Evaluation of withstand voltage properties (breakdown voltage: kV/mm) | | 415 | 418 | 405 | 414 | 281 |
| Evaluation of workability (ease of slippage) | | Bad | Good | Bad | Bad | Good |

The following were confirmed from the results listed in Table 1.

The resin films obtained in Examples 1 to 5 exhibited excellent heat resistance, excellent withstand voltage properties, and excellent workability.

On the other hand, the resin films obtained in Comparative Examples 1 and 4 to 6 had a large thermal shrinkage ratio, and exhibited inferior heat resistance.

The resin films obtained in Comparative Examples 2 and 3 had a low softening point, and exhibited inferior heat resistance.

The resin films obtained in Comparative Examples 2, 3, 5, and 6 had a large coefficient of static friction, and exhibited inferior workability.

The resin film obtained in Comparative Example 7 had a large loss tangent (tan δ), and exhibited inferior withstand voltage properties.

The invention claimed is:

1. A dielectric film comprising a resin film obtained by stretching an unstretched film produced using a crystalline hydrogenated dicyclopentadiene ring-opening polymer, and heating the resulting stretched film, wherein a ratio of racemo diads in the crystalline hydrogenated dicyclopentadiene ring-opening polymer is 60% or more, the resin film has a softening point of 250 to 320° C., a thermal shrinkage ratio of 0.01 to 5.0% when heated at 200° C. for 10 minutes, a loss tangent (tan δ) of 0.0001 to 0.0010, and a coefficient of static friction of 0.01 to 1.00, and the resin film is obtained by stretching the unstretched film at a stretching temperature of 95 to 135° C., a stretching ratio of 1.2 to 10, and a stretching speed of 100 to 30,000 mm/min, and heating the resulting stretched film at a heating temperature of 150 to 240° C. for a heating time of 0.1 to 600 minutes.

* * * * *